United States Patent
Murai

(10) Patent No.: US 7,602,544 B2
(45) Date of Patent: Oct. 13, 2009

(54) WAVELENGTH CONVERSION DEVICE AND WAVELENGTH CONVERSION METHOD

(75) Inventor: Hitoshi Murai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 12/275,326

(22) Filed: Nov. 21, 2008

(65) Prior Publication Data

US 2009/0219608 A1    Sep. 3, 2009

(30) Foreign Application Priority Data

Feb. 29, 2008    (JP) .............................. 2008-049406

(51) Int. Cl.
G02F 1/35    (2006.01)
(52) U.S. Cl. ...................... 359/326; 359/330
(58) Field of Classification Search ......... 359/326–330; 372/6, 21, 22; 385/122
See application file for complete search history.

(56) References Cited

U.S. PATENT DOCUMENTS 7,239,440 B2 *    7/2007    Tanaka .................. 359/326
2001/0013965 A1 *    8/2001    Watanabe ................ 359/161
2004/0184139 A1 *    9/2004    Tamai et al. ............. 359/326

OTHER PUBLICATIONS

Masayuki Matsumoto, "A fiber-based all-optical 3R regenerator for DPSK signals," B-10-22, 2006, 1 page.

* cited by examiner

Primary Examiner—Hemang Sanghavi
(74) Attorney, Agent, or Firm—Marvin A. Motsenbocker; Mots Law, PLLC

(57) ABSTRACT

A wavelength conversion device that obtains, from an input light, a wavelength-converted light with a wavelength shift by a wavelength shift amount of $\Delta\lambda$ is disclosed. The device comprises first and second wavelength converters. The first wavelength convertor shifts a central wavelength of a first wavelength-converted light by a first wavelength shift amount of $\Delta\lambda 1$ relative to a central wavelength of an input light. The second wavelength convertor shifts a central wavelength of a second wavelength-converted light by a second wavelength shift amount of $\Delta\lambda 2$ relative to a central wavelength of the first wavelength-converted light. The first wavelength shift amount of $\Delta\lambda 1$ and the second wavelength shift amount of $\Delta\lambda 2$ satisfy $\Delta\lambda 1 + \Delta\lambda 2 = \Delta\lambda$.

14 Claims, 11 Drawing Sheets

WAVELENGTH CONVERSION DEVICE

WAVELENGTH SPECTRA WITH FIRST WAVELENGTH CONVERTER

EYE PATTERNS WITH FIRST WAVELENGTH CONVERTER

WAVELENGTH SPECTRA WITH SECOND WAVELENGTH CONVERTER

EYE PATTERNS WITH SECOND WAVELENGTH CONVERTER

COMPARATIVE EXAMPLE

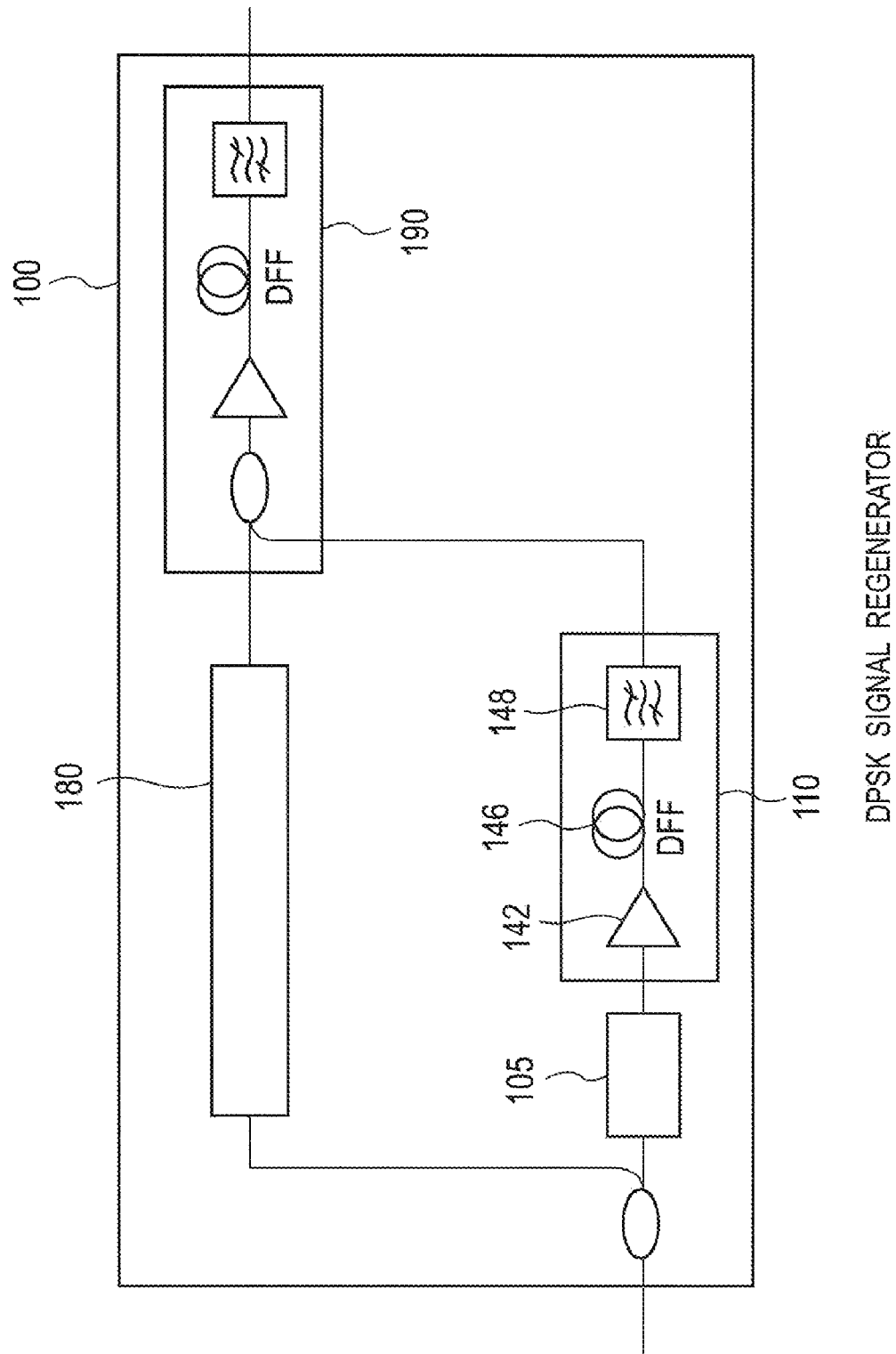

ALL-OPTICAL WAVELENGTH CONVERTER

WAVELENGTH CONVERSION (1)

WAVELENGTH CONVERSION (2)

WAVELENGTH CONVERSION DEVICE AND WAVELENGTH CONVERSION METHOD

CROSS REFERENCE TO RELATED APPLICATIONS

This application claims priority based on 35 USC 119 from prior Japanese Patent Application No. P2008-049406 filed on Feb. 29, 2008, the entire contents of which are incorporated herein by reference.

BACKGROUND OF THE INVENTION

1. Field of the Invention

The present invention relates to a wavelength conversion device and a wavelength conversion method, more specifically to all-optical wavelength conversion used in optical communication systems.

2. Description of Related Art

A technique of performing signal processing directly on an optical signal without converting the optical signal into an electric signal is a common technique with all-optical signal processing, and further is important for optical communication systems.

Hereinbelow, a differential phase shift keying (DPSK) signal regenerator in the related art is described with reference to FIG. 8. For example, a general SPSK regenerator is disclosed in Masayuki Matsumoto, "3R regeneration of a DPSK signal utilizing a non-linear effect of a fiber," General Conference of The Institute of Electronics, Information and Communication Engineers, 2006, B-10-22 (hereinafter abbreviated as "Matsumoto").

A DPSK signal that is input into a DPSK signal regenerator 100 is divided into two signals. One of the divided signals is transmitted to a delay interferometer 105 and the other divided signal is transmitted to a clock regenerator 180.

The delay interferometer 105 converts the DPSK signal into an on/off keying (OOK) signal. The OOK signal generated by the delay interferometer 105 is transmitted to an all-optical wavelength converter 110.

In the all-optical wavelength converter 110, a wavelength of the OOK signal is converted and an amplitude of an optical signal is stabilized. The wavelength-converted OOK signal, which has a wavelength converted by the all-optical wavelength converter 110, is transmitted to a phase modulator 190.

Meanwhile, the clock regenerator 180 extracts a clock signal from the DPSK signal to generate an optical clock pulse signal, and then transmits this optical clock pulse signal to the phase modulator 190.

The phase modulator 190 includes a dispersion flattened fiber (DFF), which is a highly non-linear fiber. The wavelength-converted OOK signal and the optical clock pulse signal are both input into the dispersion flattened fiber (DFF). These two signals are cross-phase modulated (XPM) while propagating through the dispersion flattened fiber, and, as a result, a phase modulation pattern coinciding with an intensity modulation pattern in the wavelength-converted OOK signal is superimposed on the optical clock pulse signal. As a consequence, a wavelength-converted DPSK signal is output from the phase modulator 190.

The all-optical wavelength converter 110 includes an optical amplifier 142, a dispersion flattened fiber (DFF) 146 functioning as a highly non-linear fiber, and an optical band-pass filter 148. The configuration and operation of this all-optical wavelength converter 110 is described with reference to FIG. 9 to FIG. 11D below.

FIG. 9 is a schematic diagram showing a configuration of the all-optical wavelength converter 110. FIGS. 10A to 10C and FIGS. 11A to 11D are diagrams illustrating the wavelength conversion using the all-optical wavelength converter 110.

The optical amplifier 142 amplifies the input OOK signal (indicated by arrow S141 in FIG. 9) to generate an amplified signal (indicated by arrow S143 in FIG. 9 and FIG. 10A). The dispersion flattened fiber 146 expands a wavelength spectral width of the amplified signal S143 to generate a DFF output signal (indicated by arrow S147 in FIG. 9). Optical band-pass filter 148 has a wavelength pass-band having a different central wavelength from that of input OOK signal S141 (FIG. 10B). Accordingly, a converted OOK signal (indicated by arrow S149 in FIG. 9) is output from the optical band-pass filter 148 having a central wavelength different from that of the input OOK signal S141 by a wavelength shifted amount of $\Delta\lambda$ (FIG. 10C).

Hereinbelow, a relationship between the signal intensity of the amplified signal S143 and the wavelength spectral width of the DFF output signal S147 is described with reference to FIGS. 11A and 11B.

The DFF output signal indicated by II in FIG. 11B is obtained by self-phase modulation induced by the amplified signal (indicated by S149 in FIG. 11A) in the dispersion flattened fiber 146. Here, the wavelength spectral width of the DFF signal becomes wider (as indicated by I in FIG. 11B) when the signal intensity of the amplified signal is increased (as indicated by I in FIG. 11A). By contrast, the wavelength spectral width of the DFF output signal becomes narrower (as indicated by III in FIG. 11B) when the signal intensity of the amplified signal is decreased (as indicated by III in FIG. 11A).

In addition, as shown in FIG. 11B, the dispersion flattened fiber 146 allows a flat wavelength spectrum to be obtained. Accordingly, the dispersion flattened fiber 146 makes the intensity of the DFF signal substantially constant even if the input signal has intensity fluctuations, and thus can remove any noise components while suppressing an effect of the intensity fluctuation of the input signal.

FIG. 11C shows a time domain waveform of the amplified signal. Meanwhile, FIG. 11D shows a time domain waveform of the wavelength-converted OOK signal S149 to be output from the wavelength converter. A noise component indicated by IV in FIG. 11C is not included in the time domain waveform of the wavelength-converted OOK signal S149 (FIG. 11D).

With this characteristic, the all-optical wavelength converter 110 functions not only as a wavelength converter but also as a discrimination circuit.

However, when a wavelength converter has to convert wavelengths of a high-speed optical signal having a data rate of 40 Gbps or more using a dispersion flattened fiber, its performance in the waveform reshaping function on the signal is significantly reduced because of the volume of the wavelength conversion.

To address this problem, the DPSK signal regenerator disclosed in Matsumoto includes multiple wavelength converters connected to one another. In each wavelength converter, an amount of wavelength conversion is adjusted such that the waveform reshaping function of the wavelength converter cannot be reduced. To be more specific, in order to achieve wavelength conversion of a shift amount of 10 nm, the DPSK signal regenerator includes five wavelength converters connected to one another with each having a wavelength shift amount set to 2 nm.

This makes it difficult to downsize the DPSK signal regenerator and also makes the DPSK signal regenerator not economically advantageous.

Furthermore, as the data rate increases, the width of the optical pulse needs to be narrower in proportion to a transmission rate, and thus, a dispersion value for the dispersion flattened fiber needs to be set smaller. An appropriate dispersion value required for the dispersion flattened fiber is proportional to a square of the pulse width, in other words, inversely proportional to a square of the data rate. Accordingly, if the data rate is increased four times, that is from 40 Gbps to 160 Gbps, the dispersion values required for the dispersion flattened fiber is reduced to $\frac{1}{16}$. This means that the required dispersion value is −0.03 ps/nm/km, for example, which is extremely smaller in absolute value than a dispersion value −0.5 ps/nm/km of the fiber used in Matsumoto. It is difficult to manufacture a dispersion flattened fiber with such a dispersion value in its absolute value.

SUMMARY OF THE INVENTION

As a result of extensive research conducted by the inventors according to this application, it is discovered that a wavelength conversion function having a waveform reshaping effect can be achieved by using two wavelength converters, setting a direction of a wavelength shift with a first wavelength converter to an inverse direction to a direction of a wavelength shift with a second wavelength converter, and rendering the size of the wavelength shift with the second wavelength converter larger than the size of the wavelength shift with the first wavelength converter.

An aspect of the invention provides a wavelength conversion device configured to obtain, from an input light, a wavelength-converted light with a wavelength shift by a wavelength shift amount of $\Delta\lambda$ that comprises: a first wavelength converter including, a first optical amplifier configured to generate first amplified light by amplifying the input light; a first dispersion flattened fiber configured to generate first fiber output light by expanding a wavelength spectral width of the first amplified light; and a first wavelength filter configured to generate first wavelength-converted light by allowing a predetermined wavelength band of the first fiber output light to transmit therethrough, wherein the first wavelength filter shifts a central wavelength of the first wavelength-converted light by a first wavelength shift amount of $\Delta\lambda 1$ relative to a central wavelength of the input light; and a second wavelength converter including, a second optical amplifier configured to generate second amplified light by amplifying the first wavelength-converted light; a second dispersion flattened fiber configured to generate second fiber output light by expanding a wavelength spectral width of the second amplified light; and a second wavelength filter configured to generate second wavelength-converted light by allowing a predetermined wavelength band of the second fiber output light to transmit therethrough, wherein the second wavelength filter shifts a central wavelength of the second wavelength-converted light by a second wavelength shift amount of $\Delta\lambda 2$ relative to the central wavelength of the first wavelength-converted light, wherein the first wavelength shift amount of $\Delta\lambda 1$ and the second wavelength shift amount of $\Delta\lambda 2$ satisfy $\Delta\lambda 1+\Delta\lambda 2=\Delta\lambda$, $\Delta\lambda 1\times\Delta\lambda 2<0$.

Here, it is preferable that the first wavelength shift amount of $\Delta\lambda 1$ and the second wavelength shift amount of $\Delta\lambda 2$ are set up to satisfy $|\Delta\lambda 1|<|\Delta\lambda 2|$.

In an embodiment of the wavelength conversion device, it is preferable to further provide wavelength filters located on an input side and an output side of the first optical amplifier.

Another aspect of the invention provides a wavelength conversion method for providing a wavelength shift by a wavelength shift amount of $\Delta\lambda$ for an input light that comprises: causing a first wavelength converter including a first optical amplifier, a first dispersion flattened fiber and a first wavelength filter to generate first wavelength-converted light by shifting a central wavelength of the input light by a first wavelength shift amount of $\Delta\lambda 1$; and causing a second wavelength converter including a second optical amplifier, a second dispersion flattened fiber and a second wavelength filter to generate second wavelength-converted light by shifting a central wavelength of the first wavelength-converted light by a second wavelength shift amount of $\Delta\lambda 2$, wherein the first wavelength shift amount of $\Delta\lambda 1$ and the second wavelength shift amount of $\Delta\lambda 2$ satisfy $\Delta\lambda 1+\Delta\lambda 2=\Delta\lambda$, $\Delta\lambda 1\times\Delta\lambda 2<0$.

Here, it is preferable that the first wavelength shift amount of $\Delta\lambda 1$ and the second wavelength shift amount of $\Delta\lambda 2$ are set up to satisfy $|\Delta\lambda 1|<|\Delta\lambda 1|$.

In an embodiment of the conversion device and the wavelength conversion method, the first wavelength shift amount of $\Delta\lambda 1$ in the first wavelength converter and second wavelength shift amount of $\Delta\lambda 2$ in the second wavelength converter are set up to satisfy $\Delta\lambda 1\times\Delta\lambda 2<0$ and $|\Delta\lambda 1|<|\Delta\lambda 2|$.

BRIEF DESCRIPTION OF THE DRAWINGS

FIG. 8 is a schematic diagram for explaining a conventional DPSK signal regenerator.

DETAILED DESCRIPTION OF EMBODIMENTS

Now, an embodiment of this invention is described below with reference to the accompanying drawings. It is to be noted that shapes, sizes, and layout relations of respective constituents are schematically illustrated for allowing a reader to understand this invention. While a preferred configuration example of the present invention is described below, it is to be understood that material and numerical conditions of the respective constituents represent just one preferred example. Accordingly, this invention is not limited only to the embodiment to be described below and various changes and modifications are possible to achieve an effect of this invention without departing from the scope of this embodiment.

Figure 1:
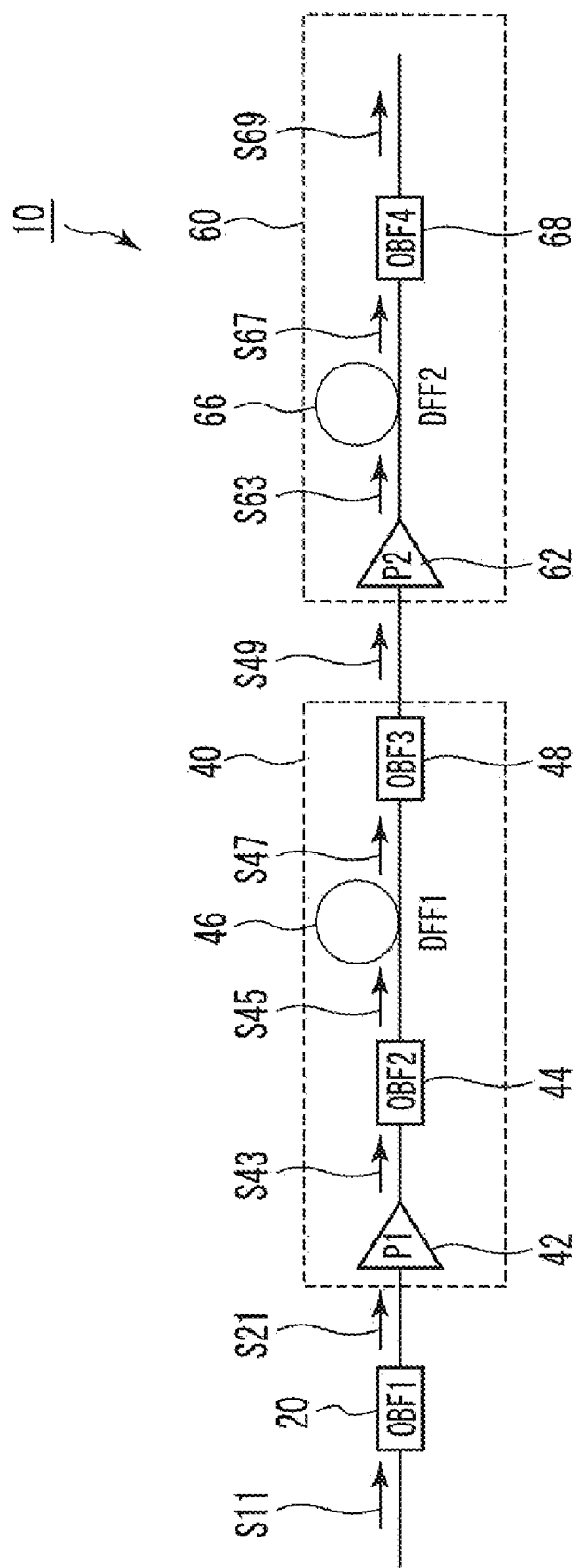
FIG. 1 is a schematic diagram for explaining a wavelength conversion device of an embodiment of this invention.

A wavelength conversion device of an embodiment is described with reference to FIG. 1. Here, input light S11 is input into a wavelength conversion device 10 and is assumed to be a "return to zero" (RZ) signal having a transmission rate of 160 Gbps and a pulse width of 2.5 ps.

The wavelength conversion device 10 of the embodiment is configured to include a first wavelength converter 40 and a second wavelength converter 60. Additionally, the wavelength conversion device 10 includes a first front-stage wavelength filter (optical band-pass filter: OBF1) 20 located at the input side of the first wavelength converter 40. The wavelength conversion device 10 shifts a wavelength of the input light by a total wavelength shift amount of $\Delta\lambda$.

The first wavelength converter 40 includes a first optical amplifier 42, a second front-stage wavelength filter (OBF2) 44, a first dispersion flattened fiber (DFF1) 46, and a first wavelength filter (OBF3) 48.

The second wavelength converter 60 includes a second optical amplifier 62, a second dispersion flattened fiber (DFF2) 66, and a second wavelength filter (OBF4) 68.

The first front-stage wavelength filter 20 and the second front-stage wavelength filter 44 are respectively provided at an input end and at an output end of the first optical amplifier 42 and configured to remove amplified spontaneous emission (ASE) noise contained in the input light S11.

The first front-stage wavelength filter 20 is a second-order super-Gaussian shape filter having a passing band width (BW) of 3 nm. Here, an mth-order super-Gaussian shape is expressed by a following function.

$$f(t) = \exp\{-t^{\hat{}}(2m)\}$$

The second front-stage wavelength filter 44 is a Gaussian shape filter having a passing band width (BW) of 3 nm.

The first optical amplifier 42 amplifies the intensity of the input light S21 that is input to the first wavelength converter 40 via the first front-stage wavelength filter 20 to be a desired optical intensity and thereby generates a first amplified light S43. The ASE noises added at the time of amplification by this first optical amplifier 42 are removed by the second front-stage wavelength filter 44.

The first dispersion flattened fiber (DFF1) 46 expands a wavelength spectral width of the first amplified light S45 transmitted via the second front-stage wavelength filter 44 by a self-phase modulation (SPM) effect to thereby generate a first fiber output light S47.

The first wavelength filter 48 allows the first fiber output light S47 to transmit a predetermined wavelength band and to thereby generate a first wavelength-converted light S49. Here, the first wavelength filter 48 is a Gaussian shape filter having a passing band width (BW) of 3 nm. Moreover, a central wavelength $\lambda 1$ of the passing band width (BW) is shifted from a central wavelength $\lambda 0$ of the input light by a first wavelength shift amount of $\Delta\lambda 1$ ($=\lambda 1-\lambda 0$).

Figure 2:
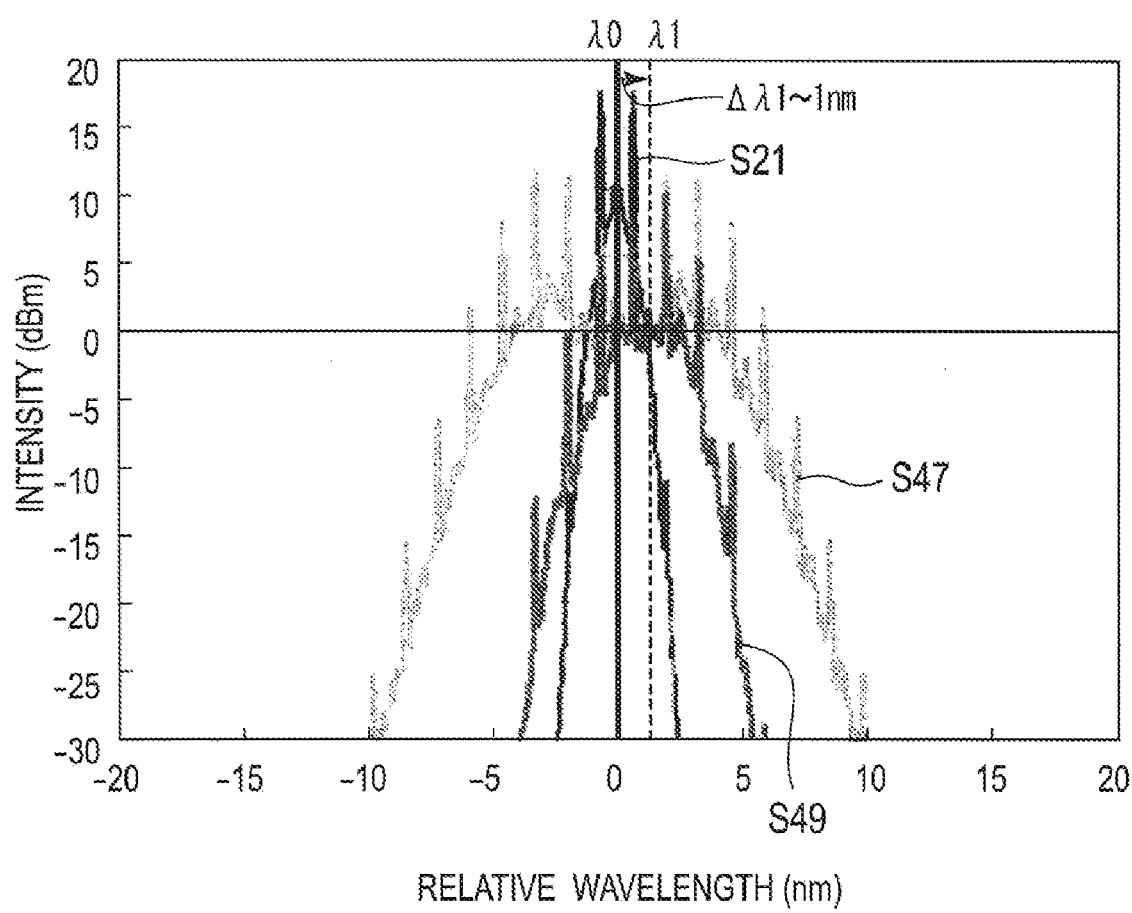
FIG. 2 is a graph showing calculation results of wavelength spectra in a first wavelength converter.

A wavelength spectrum in first wavelength converter 40 is described with reference to FIG. 2. FIG. 2 is a graph showing a calculation result of the wavelength spectrum in the first wavelength converter 40. Here, the first dispersion flattened fiber has a length of 1 km, a dispersion value at −0.15 ps/nm/km, and a non-linear constant at 10 km$^{-1}$W$^{-1}$, while the output power of first optical amplifier is set to be at 23 dBm. In FIG. 2, a relative wavelength (nm) is measured along the horizontal axis, wherein the relative wavelength uses the central wavelength $\lambda 0$ of the input light S21 that is input to the first wavelength converter 40 as a reference, and the optical intensity (dBm) is measured along the longitudinal axis.

The first fiber output light S47 that is output from the first dispersion flattened fiber 46 has an expanded wavelength spectral width as compared to the input light S21. Here, the central wavelength of the first fiber output light S47 is substantially equal to that of the input light S21.

In this case, the first wavelength shift amount of $\Delta\lambda 1$ is set at 1 nm in order to shift the wavelength toward a longer wavelength side in relationship to the central wavelength $\lambda 0$ of the input light S21. That is, the central wavelength $\lambda 1$ of the first wavelength filter 48 (first wavelength-converted light S49) is obtained by $\lambda 1 = \lambda 0 + 1$.

Figure 3A:
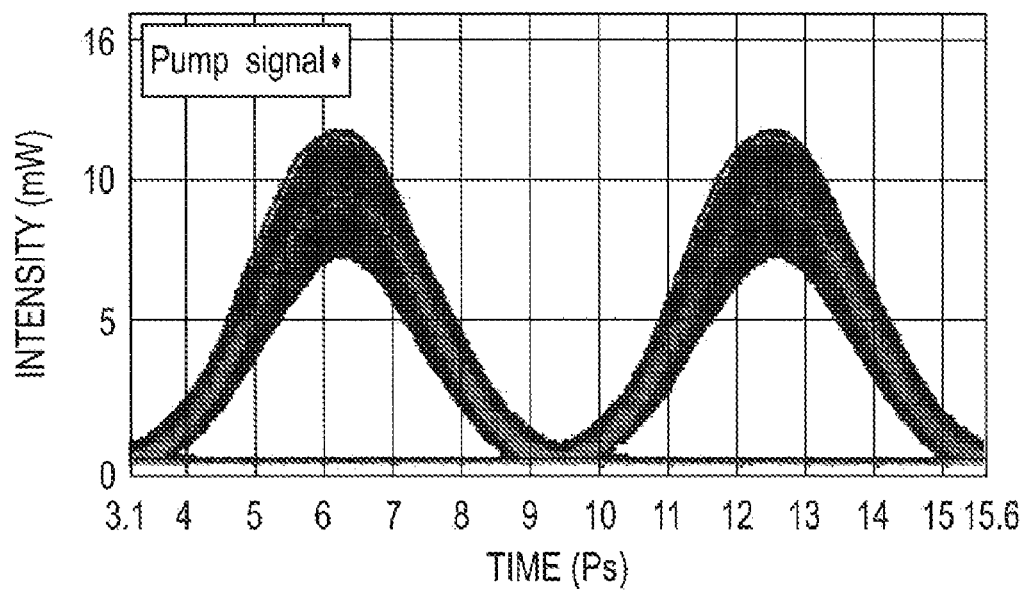
FIGS. 3A and 3B are graphs showing eye patterns of input light and first wavelength-converted light.
Figure 3B:
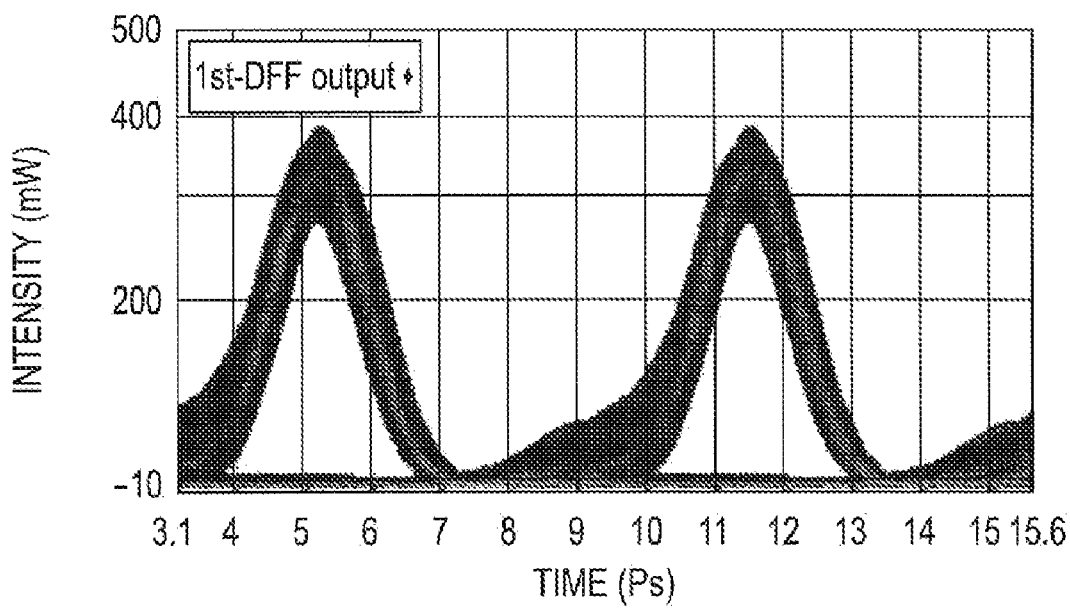

FIGS. 3A and 3B are graphs showing eye patterns of the input light S21 and the first wavelength-converted light S49. FIG. 3A shows the eye pattern of the input light S21 and FIG. 3B shows the eye pattern of the first wavelength-converted light S49.

When FIG. 3A is compared with FIG. 3B, the first wavelength-converted light S49 shown in FIG. 3B has an asymmetric shape and a narrower pulse width as compared to the input light S21 shown in FIG. 3A.

As the pulse width becomes narrower, the second wavelength converter 60 can obtain the wavelength-converted light more efficiently and with a higher degree of quality. For example, the pulse width of the input light ranges between 2 to 3 ps in the case of a data rate at 160 Gbps. Here, it is preferable to set the width of the first wavelength-converted light S49 in a range from 1 to 1.5 ps, which is approximately half of the input light S11.

The second optical amplifier 62 amplifies the intensity of the first wavelength-converted light S49 being input to the second wavelength converter 60 into desired optical intensity to thereby generate a second amplified light S63. The second dispersion flattened fiber 66 expands a wavelength spectral width of the second amplified light S63 by way of the self-phase modulation (SPM) effect to thereby generate a second fiber output light (indicated by arrow S67 in FIG. 1).

The second wavelength filter 68 allows the second fiber output light S67 to transmit a predetermined wavelength band to thereby generate a second wavelength-converted light S69. Here, the second wavelength filter 68 is a Gaussian shape filter having a passing band width (BW) of 1.3 nm.

Moreover, a central wavelength $\lambda 2$ of the passing band width (BW) is shifted from the central wavelength $\lambda 1$ of first wavelength-converted light S49 by a second wavelength shift amount of $\Delta\lambda 2$ ($=\lambda 2-\lambda 1$).

The wavelength conversion device 10 achieves the wavelength shift corresponding to the total wavelength shift amount of $\Delta\lambda$ by the two wavelength converters, specifically using the first wavelength converter 40 and the second wavelength converter 60. That is, $\Delta\lambda 1+\Delta\lambda 2=\Delta\lambda$ holds true.

Meanwhile, either one of the first wavelength shift amount of $\Delta\lambda 1$ or the second wavelength shift amount of $\Delta\lambda 2$ is set to a positive value while the other is set to a negative value so as to satisfy $\Delta\lambda 1 \cdot \Delta\lambda 2 < 0$. In this embodiment, the first wavelength shift amount of $\Delta\lambda 1$ is set to a positive value ($\Delta\lambda 1 > 0$), that is, as a wavelength shift toward a longer wavelength side. Accordingly, the second wavelength shift amount of $\Delta\lambda 2$ is set to a negative value ($\Delta\lambda 2 < 0$), that is, as a wavelength shift toward a shorter wavelength side. In addition, the size ($|\Delta\lambda 2|$) of the wavelength shift by the second wavelength converter 60 is set larger than the size ($|\Delta\lambda 1|$) of the wavelength shift by the first wavelength converter 40 ($|\Delta\lambda 1| < |\Delta\lambda 2|$).

Figure 4:
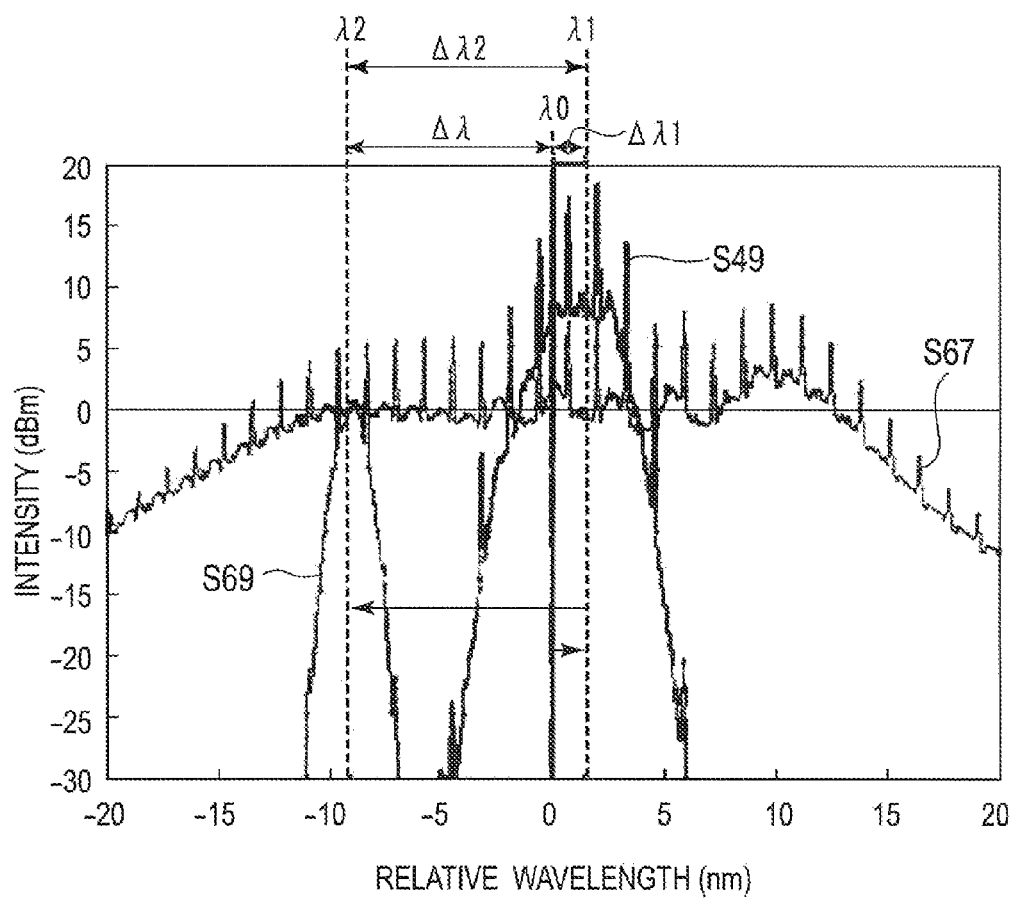
FIG. 4 is a graph showing calculation results of wavelength spectra in a second wavelength converter.

A wavelength spectrum in the second wavelength converter 60 is described with reference to FIG. 4. FIG. 4 is a graph showing a calculation result of the wavelength spectrum in the second wavelength converter 60. Here, the second dispersion flattened fiber 66 has the same characteristics as the first dispersion flattened fiber 46, and the output power of the second optical amplifier 62 is set at 26 dBm. In FIG. 4, the lateral axis indicates a relative wavelength (nm) using the central wavelength $\lambda 0$ of the input light S21 that is input to the first wavelength converter 40 as a reference, and the longitudinal axis indicates the optical intensity (dBm). Here, the second wavelength filter is formed into a Gaussian shape having a band width of 1.3 nm so as to render the inputted 160-Gbps pulse width approximately equal to the pulse width of second wavelength-converted light S69.

The second fiber output light S67 output from the second dispersion flattened fiber 66 has an expanded wavelength spectral width as compared to the first wavelength-converted light S49. Here, the spectral shape of the second fiber output light S67 is asymmetric while reflecting the asymmetry of the first wavelength-converted light S49 to be input. As shown in the wavelength spectrum of the second fiber output light S67, a waveform having excellent flatness is formed in a negative region of the relative wavelength, i.e. the wavelength region (on the shorter wavelength side) opposite to the wavelength region in the direction of the wavelength shift (on the longer wavelength side) in the first wavelength converter 40. In the spectrum shown in FIG. 4, a large fluctuation in the intensity (dBm) is observed on the longer wavelength side (the region where the relative wavelength is positive). By contrast, on the shorter wavelength side (the region where the relative wavelength is negative), a fluctuation in the intensity is small and the flat shape is formed at least to the extent where the relative wavelength is equal to approximately −10 nm.

This fact shows that it is possible to obtain a second wavelength-converted light S69 having excellent quality by setting the central wavelength $\lambda\Delta 2$ of the second wavelength filter 68 to satisfy the condition of $\Delta\lambda 1 \times \Delta\lambda 2 < 0$. Moreover, since the second wavelength shift amount of $\Delta\lambda 2$ can be set larger than the first wavelength shift amount of $\Delta\lambda 1$, it is possible to convert the wavelength efficiently.

Specifically, by shifting the wavelength with two wavelength converters, $\Delta\lambda 1 = 1$ nm and $\Delta\lambda 2 = -10$ nm, it is possible to achieve the wavelength shift of $\Delta\lambda = \Delta\lambda 1 + \Delta\lambda 2 = -9$ nm as a result.

Figure 5A:
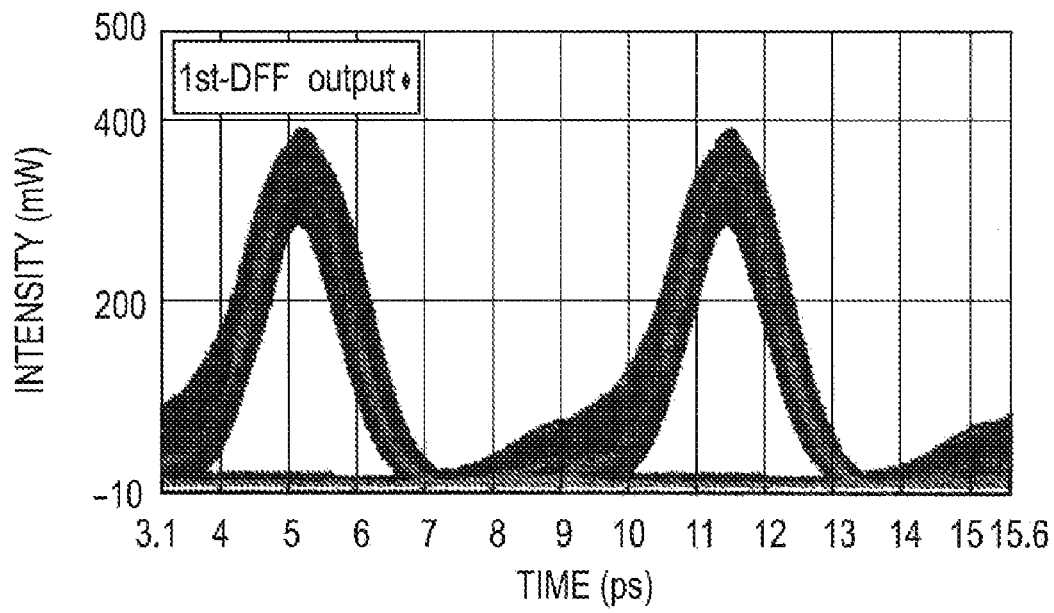
FIGS. 5A and 5B are graphs showing eye patterns of the first wavelength-converted light and the second wavelength-converted light.
Figure 5B:
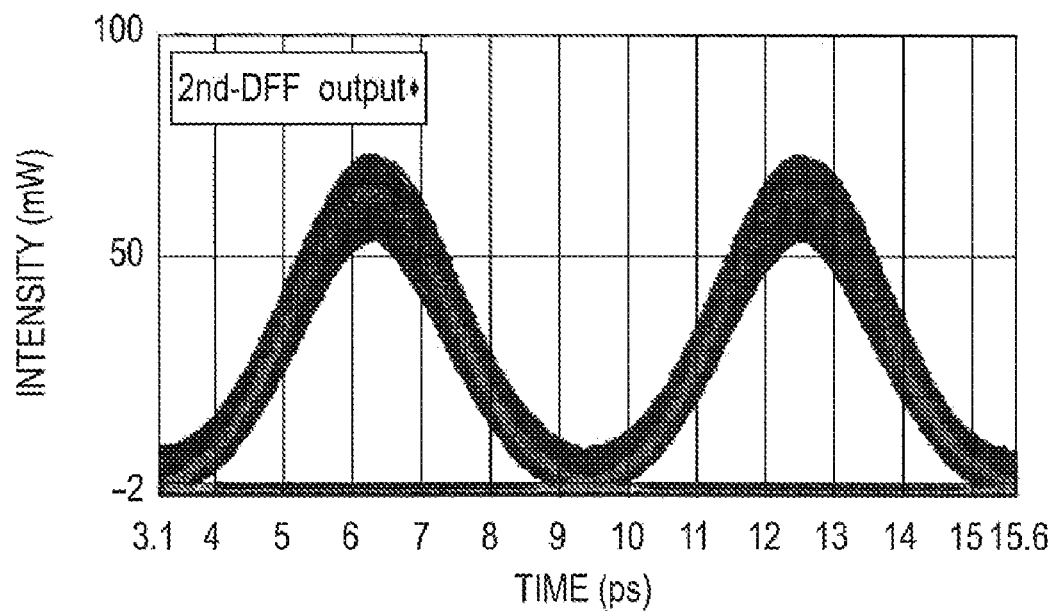

FIGS. 5A and 5B are graphs showing eye patterns of the first wavelength-converted light and the second wavelength-converted light. FIG. 5A shows the eye pattern of the first wavelength-converted light S49 and FIG. 5B shows the eye pattern of the second wavelength-converted light S69.

There is no deterioration in the waveform as observed in the second wavelength-converted light S69. The second wavelength-converted light S69 shows a very good eye opening. As a result, even if the dispersion value of the dispersion flattened fiber is around −0.15 ps in the case of the data rate at 160 Gbps, an excellent waveform reshaping effect is achieved.

The above-described embodiment is merely one example and this invention is not limited only to these conditions. For example, the shapes and widths in the pass-bands of the first and second front-stage wavelength filters as well as the first and second wavelength filters may be arbitrarily set up so as to correspond to the width and the like of the optical pulse to be input. Meanwhile, concerning the first wavelength shift amount and the second wavelength shift amount, it is possible to employ a suitable combination to achieve the desired wavelength shift amount of $\Delta\lambda$ while satisfying $\Delta\lambda 1 + \Delta\lambda 2 < \Delta\lambda$, $\Delta\lambda 1 \times \Delta\lambda 2 < 0$, and $|\Delta\lambda| < |\Delta\lambda 2|$.

Figure 6A:
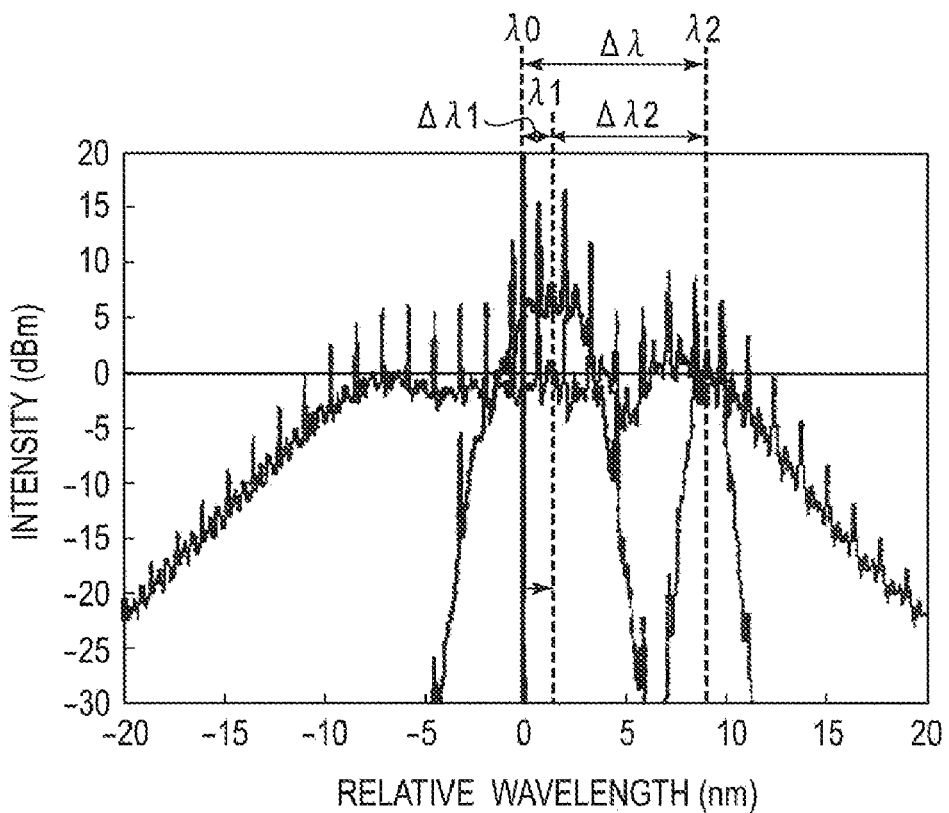
FIGS. 6A and 6B are graphs showing a wavelength spectrum and an eye pattern of a comparative example.
Figure 6B:
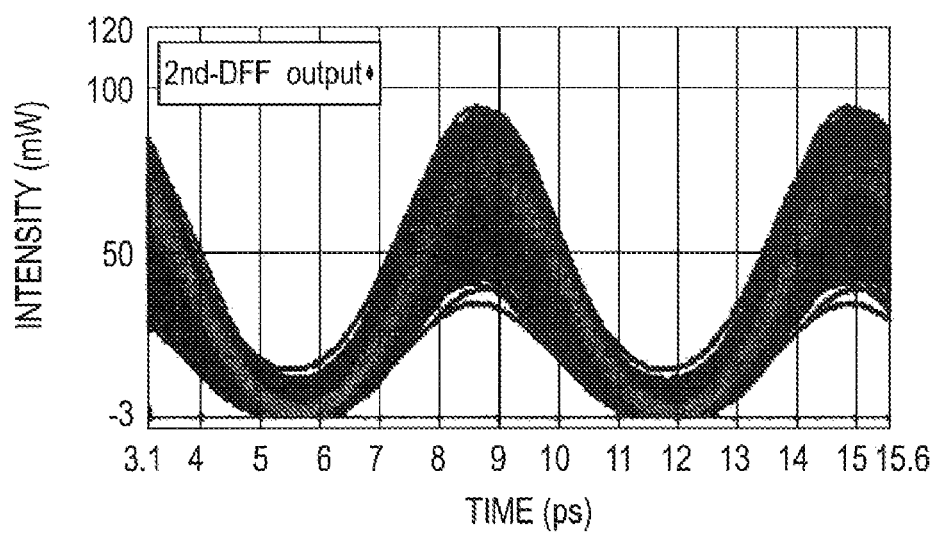

Next, a case of $\Delta\lambda 1 \Delta\lambda 2 > 0$ is described as a comparative example with reference to FIGS. 6A and 6B. In this case, $\Delta\lambda 1$ is set equal to 1 nm while $\Delta\lambda 2$ is set equal to 8 nm in order to achieve the wavelength shift of 9 nm similarly (FIG. 6A). Here, the second wavelength filter 68 is configured to allow a positive relative wavelength region, i.e. a region with a large fluctuation in light intensity, from the second fiber output light to transmit therethrough.

FIG. 6B is a view showing an eye pattern of the second wavelength-converted light in the comparative example. An opening of the eye pattern is smaller in comparison with the case of $\Delta\lambda 1 \times \Delta\lambda 2 < 0$ (FIG. 5B).

Therefore, when setting $\Delta\lambda 1 + \Delta\lambda 2 = \Delta\lambda$ and $\Delta\lambda 1 \times \Delta\lambda 2 > 0$, it is not possible to obtain favorable wavelength-converted light even if the amount of amplification by the second optical amplifier is optimized.

Figure 7A:
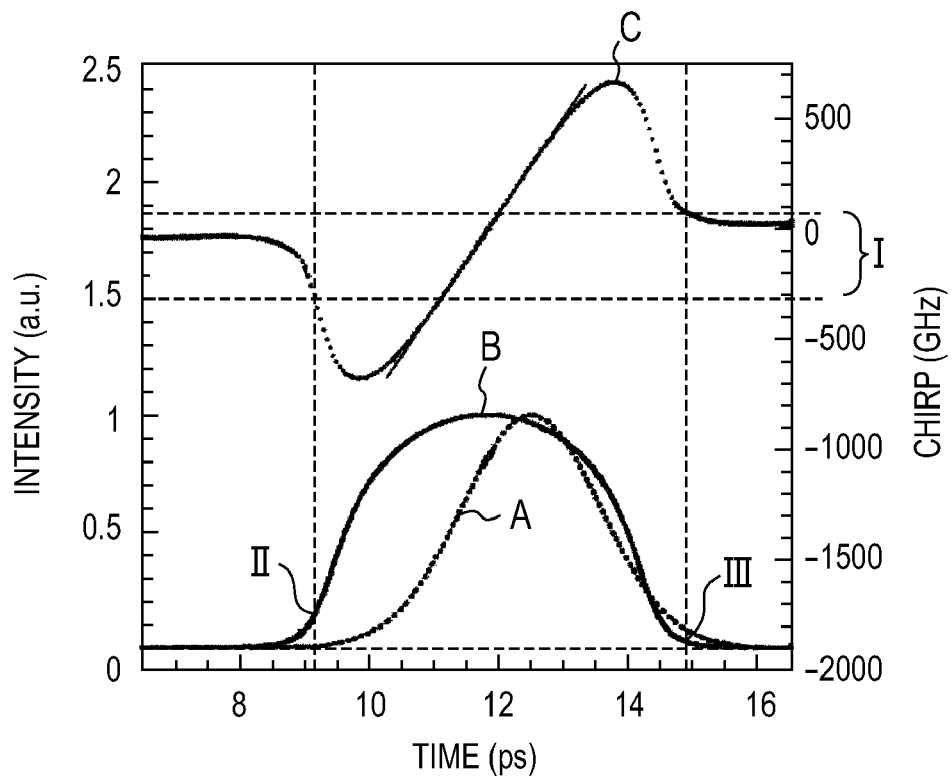
FIGS. 7A and 7B are schematic diagrams for explaining asymmetry of the first wavelength-converted light.
Figure 7B:
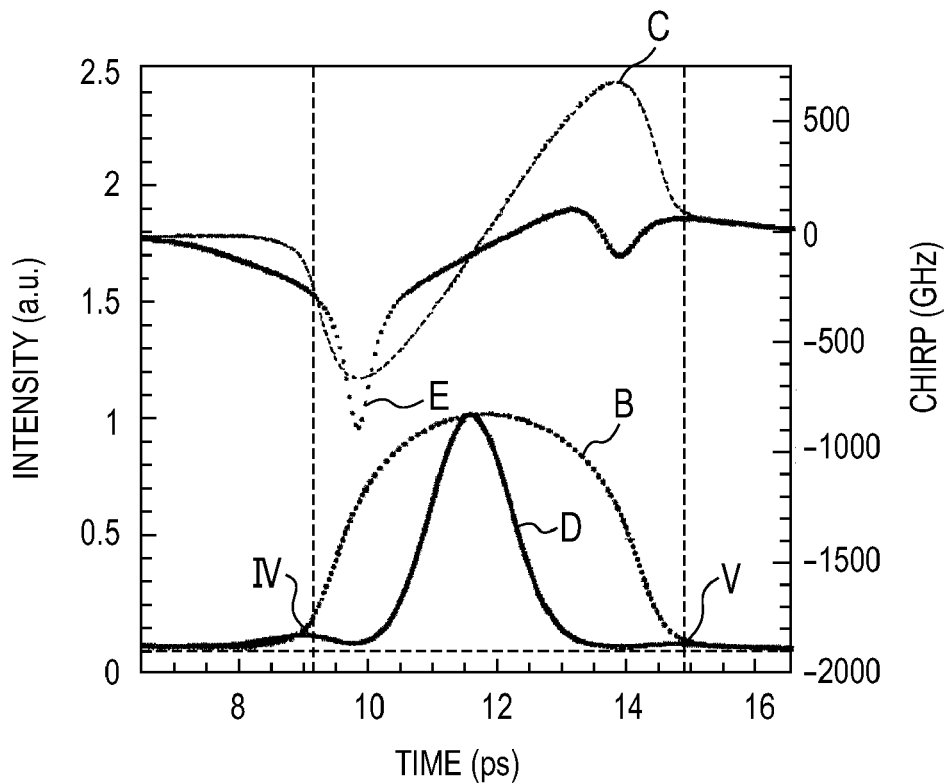
Figure 9:
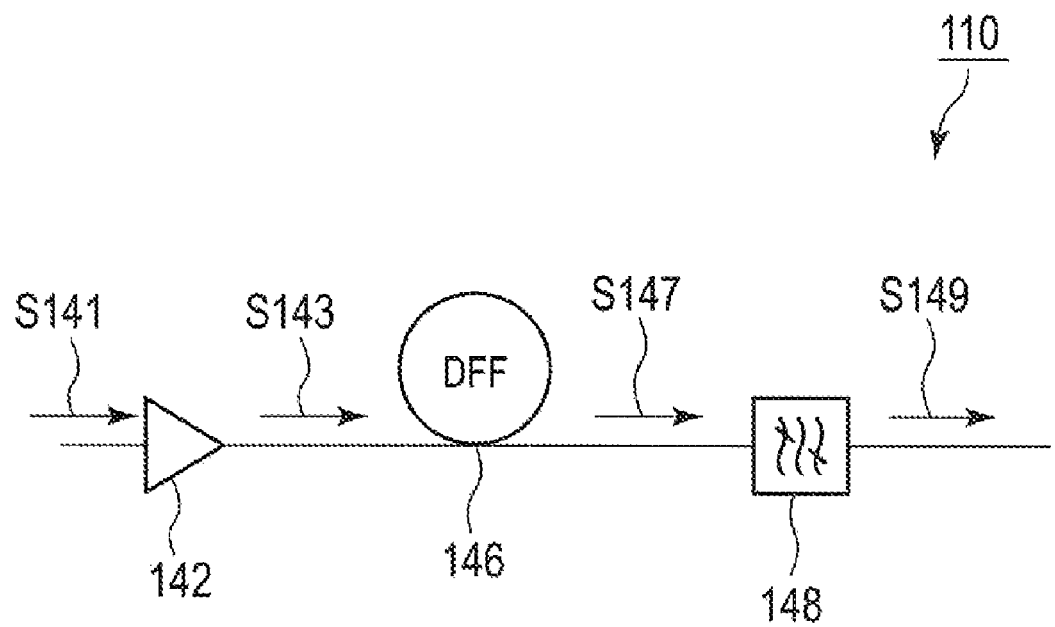
FIG. 9 is a schematic diagram showing a configuration of an all-optical wavelength converter.
Figure 10A:
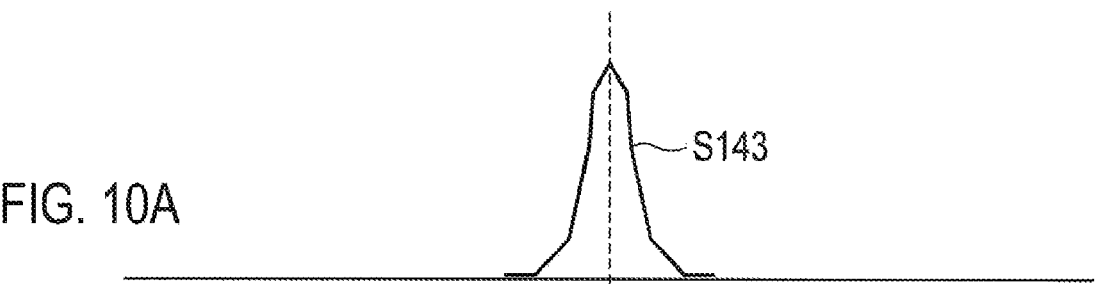
FIGS. 10A, 10B and 10C are a first group of diagrams illustrating wavelength conversion using the all-optical wavelength converter.
Figure 10B:
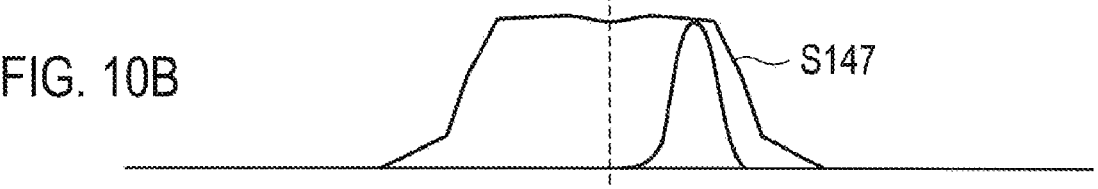
Figure 10C:
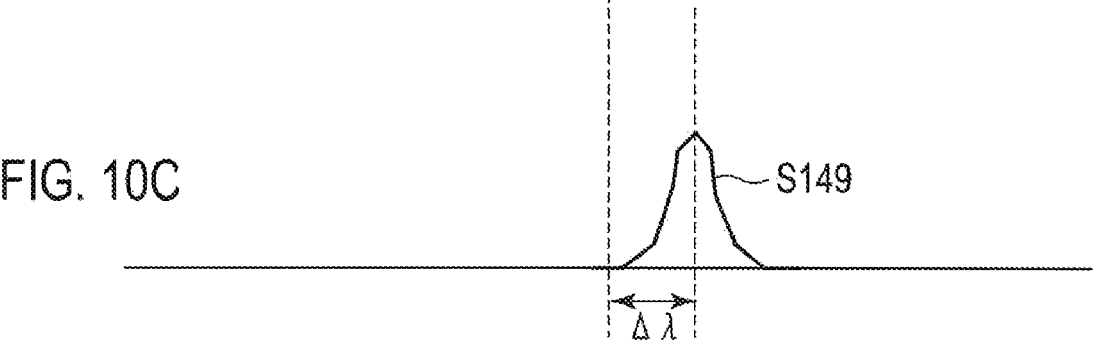
Figure 11A:
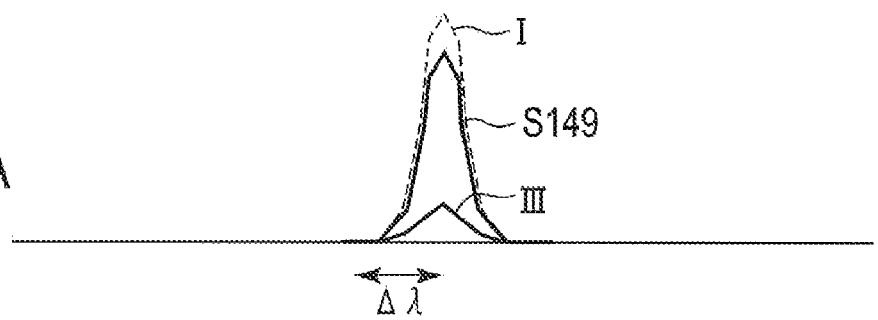
FIGS. 11A, 11B, 11C and 11D are a second group of diagrams illustrating wavelength conversion using the all-optical wavelength converter.
Figure 11B:
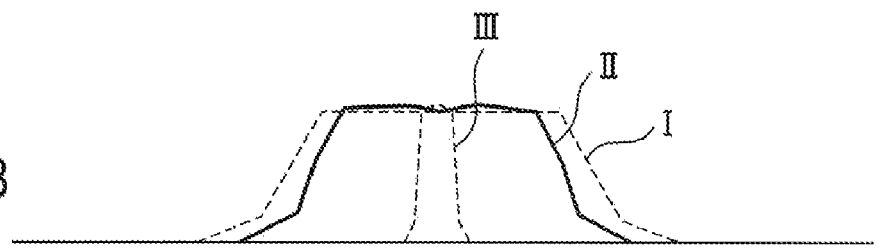
Figure 11C:
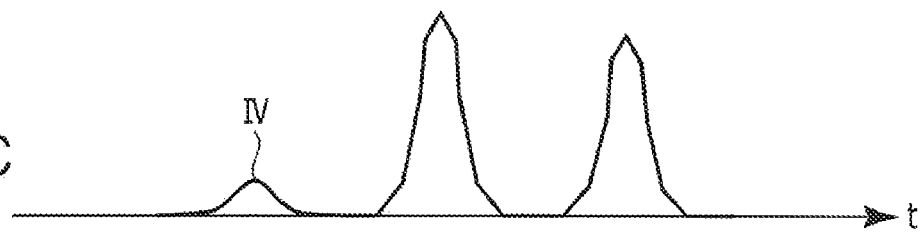
Figure 11D:
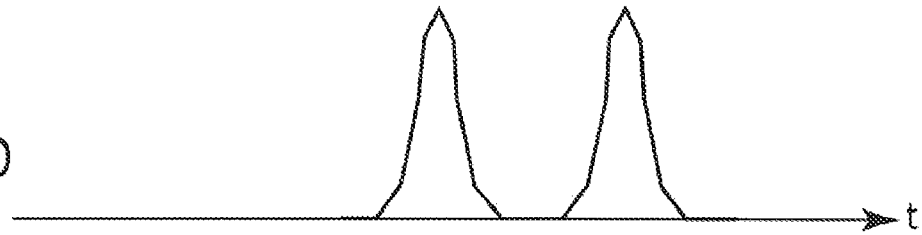

As described above, the reason for not being capable of obtaining the favorable wavelength-converted light when setting $\Delta\lambda 1 + \Delta\lambda 2 = \Delta\lambda$ and $\Delta\lambda 1 \times \Delta\lambda 2 > 0$ is attributable to the asymmetry of the first wavelength-converted light. The cause of the asymmetry of the first wavelength-converted light is described with reference to FIGS. 7A and 7B. FIGS. 7A and 7B are schematic diagrams for explaining the waveform of the first wavelength-converted light. FIG. 7A shows a result of calculation of the waveform and a frequency chirp characteristic of the first fiber output light, in the case where a single optical pulse is input. FIG. 7B shows a result of calculation of the waveform and the frequency chirp characteristic of the first wavelength-converted light.

In FIG. 7A, curved line A shows a pulse waveform of the input light, curved line B shows a pulse waveform of the first fiber output light, and curved line C shows a frequency chirp characteristic of the first fiber output light. Meanwhile, in FIG. 7B, curved line B shows the pulse waveform of the first fiber output light, curved line C shows the frequency chirp characteristic of the first fiber output light, curved line D shows a pulse waveform of the first wavelength-converted light, and curved line E shows a frequency chirp characteristic of the first wavelength-converted light.

In FIG. 7A, a portion (I) shows a pass-band of the first wavelength filter. The pass-band is shifted from a frequency center to a lower frequency side, i.e. the longer wavelength side in an amount equivalent to the frequency corresponding to the first wavelength shift amount of $\Delta\lambda 1$. A time domain waveform of the first fiber output is close to a parabolic shape and the frequency is constantly increased in the vicinity of the center of pulse time.

An ideal wavelength conversion pulse is obtainable if it is possible to cut out only the region in which the frequency is increased constantly by using the first wavelength filter. Nevertheless, a chirp characteristic having a strong non-linear shape is actually observed in a time region close to an edge of the first fiber output light. Accordingly, unnecessary energy leaks out to the first wavelength converted light. When a leading edge (II) of the pulse is compared with a trailing edge (III) thereof, it is apparent that more pulse energy leaks into the pass-band, the pulse energy in the vicinity of the leading edge (II) of the first fiber output light as the central wavelength of the first wavelength filter is shifted to the longer wavelength (lower frequency) side.

In FIG. 7B, a pedestal (IV) occurs in the vicinity of the leading edge due to the leakage of the energy into the vicinity of the leading edge of the first fiber output light. At this time, a pedestal (V) is small on the shorter wavelength (higher frequency) side due to less leakage of the energy. Note that this example shows the case of shifting the wavelength to the longer wavelength side using the first wavelength converter. By contrast, in the case of shifting to the shorter wavelength side, the pedestal becomes smaller in the vicinity of the leading edge and the pedestal becomes larger in the vicinity of the trailing edge.

These pedestal components are the main cause of the asymmetry of the first wavelength-converted light. A part of pedestal components also leaks out to the second wavelength converted light with the same process in the first wavelength conversion, when the case of $\Delta\lambda 1 \Delta\lambda 2 > 0$. It leads to strong waveform distortion in the second wavelength converted signal. As the amount of pedestal components in the first wavelength converted light strongly depends on the light power input into the first wavelength converter, the waveform distortion in the second wavelength converted light is dominated by the light power input into the first wavelength converter.

Meanwhile, with reference to wavelength distribution of the wavelength conversion pulse, the spectral flatness is damaged on the longer wavelength side as the pedestal occurs on the longer wavelength side. Accordingly, it is difficult to convert the wavelength with two wavelength converters in the same direction, i.e. to convert the wavelength while satisfying $\Delta\lambda 1 \times \Delta\lambda 2 > 0$.

As described above, according to the wavelength conversion device and the wavelength conversion method of this embodiment, the first wavelength shift amount of $\Delta\lambda 1$ in the first wavelength converter and the second wavelength shift amount of $\Delta\lambda 2$ in the second wavelength converter are set up to satisfy $\Delta\lambda 1 \times \Delta\lambda 2 < 0$ and $|\Delta\lambda 1| < |\Delta\lambda 2|$.

By setting up as described above, the second fiber output light has the spectral shape having excellent flatness in the opposite wavelength region to the direction of the wavelength shift by the first wavelength converter using the central wavelength of the input light as a reference, and the second wavelength filter allows the second fiber output light to transmit this region having excellent flatness. Accordingly, it is possible to obtain the wavelength-converted light having excellent quality.

Moreover, as the second fiber output light has the waveform having excellent flatness in the wavelength region opposite to the direction of the wavelength shift by the first wavelength converter, it is possible to increase the second wavelength shift amount of $\Delta\lambda 2$. As a result, it is possible to convert the wavelength with two wavelength converters whereas conventionally the wavelength for 2 nm has been converted with five wavelength converters to obtain the wavelength shift in 10 nm, for example.

As described above, according to the wavelength conversion device and the wavelength conversion method of this embodiment, it is possible to realize a wavelength conversion function having a waveform reshaping effect with a simple configuration.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A wavelength conversion device configured to obtain, from an input light, a wavelength-converted light with a wavelength shift by a wavelength shift amount of $\Delta\lambda$, comprising:
    a first wavelength converter including,
        a first optical amplifier configured to generate first amplified light by amplifying the input light;
        a first dispersion flattened fiber configured to generate first fiber output light by expanding a wavelength spectral width of the first amplified light; and
        a first wavelength filter configured to generate first wavelength-converted light by allowing a predetermined wavelength band of the first fiber output light to transmit therethrough, wherein the first wavelength filter shifts a central wavelength of the first wavelength-converted light by a first wavelength shift amount of $\Delta\lambda 1$ relative to a central wavelength of the input light; and
    a second wavelength converter including,
        a second optical amplifier configured to generate second amplified light by amplifying the first wavelength-converted light;
        a second dispersion flattened fiber configured to generate second fiber output light by expanding a wavelength spectral width of the second amplified light; and
        a second wavelength filter configured to generate second wavelength-converted light by allowing a predetermined wavelength band of the second fiber output light to transmit therethrough, wherein the second wavelength filter shifts a central wavelength of the second wavelength-converted light by a second wavelength shift amount of $\Delta\lambda 2$ relative to the central wavelength of the first wavelength-converted light,
    wherein the first wavelength shift amount of $\Delta\lambda 1$ and the second wavelength shift amount of $\Delta\lambda 2$ satisfy $\Delta\lambda 1 + \Delta\lambda 2 = \Delta\lambda$, $\Delta\lambda 1 \times \Delta\lambda 2 < 0$.

2. The device of claim 1, wherein the first wavelength shift amount of $\Delta\lambda 1$ and the second wavelength shift amount of $\Delta\lambda 2$ satisfy $|\Delta\lambda 1| < |\Delta\lambda 2|$.

3. The device of claim 1, further comprising wavelength filters respectively provided on an input side and an output side of the first optical amplifier.

4. The device of claim 1, wherein a width of the first wavelength-converted light is half of the width of the input light.

5. The device of claim 1, wherein a width of the first wavelength-converted light is set approximately half of the width of the input light.

6. The device of claim 1, wherein the shifting direction of $\Delta\lambda 1$ and the shifting direction of $\Delta\lambda 2$ are opposite to each other.

7. The device of claim 5, wherein the first wavelength shift amount of $\Delta\lambda 1$ is set to a positive value and the second wavelength shift amount of $\Delta\lambda 2$ is set to a negative value.

8. The device of claim 1, wherein the filters provided at the input end and at the output end of the first optical amplifier are configured to remove amplified spontaneous emission noises contained in the input light.

9. The device of claim 1, wherein one of the filters provided at the input end is the first front-stage filter and other is the second front-stage filter, wherein the first front-stage filter is a second-order super-Gaussian shape filter, and the second front-stage filter is a Gaussian shape filter, and the first front-stage filter has a passing band width, which is the same as that of the second front-stage filter.

10. A wavelength conversion method for providing a wavelength shift by a wavelength shift amount of $\Delta\lambda$ for an input light, comprising:
    causing a first wavelength converter including a first optical amplifier, a first dispersion flattened fiber and a first wavelength filter to generate first wavelength-converted light by shifting a central wavelength of the input light by a first wavelength shift amount of $\Delta\lambda 1$; and
    causing a second wavelength converter including a second optical amplifier, a second dispersion flattened fiber and a second wavelength filter to generate second wavelength-converted light by shifting a central wavelength of the first wavelength-converted light by a second wavelength shift amount of $\Delta\lambda 2$, wherein the first wavelength shift amount of $\Delta\lambda 1$ and the second wavelength shift amount of $\Delta\lambda 2$ satisfy $\Delta\lambda 1 + \Delta\lambda 2 = \Delta\lambda$, $\Delta\lambda 1 \Delta\lambda 2 < 0$.

11. The method of claim 10, wherein the first wavelength shift amount of $\Delta\lambda 1$ and the second wavelength shift amount of $\Delta\lambda 2$ satisfy $|\Delta\lambda 1| < |\Delta\lambda 2|$.

12. The method of claim 10, wherein a width of the first wavelength-converted light is half of the width of the input light.

13. The method of claim 10, wherein a width of the first wavelength-converted light is set approximately half of the width of the input light.

14. The method of claim 10, wherein the shifting direction of $\Delta\lambda 1$ and the shifting direction of $\Delta\lambda 2$ are opposite to each other.

* * * * *